(12) United States Patent
Stieff et al.

(10) Patent No.: US 6,427,346 B1
(45) Date of Patent: Aug. 6, 2002

(54) METHOD AND APPARATUS FOR CALIBRATION OF NO-COMPENSATION AND UNIVERSAL WHEEL ADAPTERS UTILIZED IN VEHICLE WHEEL ALIGNMENT PROCEDURES

(75) Inventors: Michael T. Stieff, Wentzville; Timothy A. Strege, Ballwin; James W. McClenahan, Hazelwood, all of MO (US)

(73) Assignee: Hunter Engineering Company, Bridgeton, MO (US)

( * ) Notice: Subject to any disclaimer, the term of this patent is extended or adjusted under 35 U.S.C. 154(b) by 79 days.

(21) Appl. No.: 09/585,006

(22) Filed: Jun. 1, 2000

(51) Int. Cl.⁷ .............................................. G01C 25/00
(52) U.S. Cl. ..................................... 33/203; 33/203.18
(58) Field of Search ............................. 33/203, 501.05, 33/501.06, 501.07, 203.18, 203.19, 203.2, 203.21, 502; 73/1.01, 865.9; 702/105, 85; 700/279

(56) References Cited

U.S. PATENT DOCUMENTS

| | | | | |
|---|---|---|---|---|
| 4,138,825 A | | 2/1979 | Pelta | 33/203.18 |
| 4,180,915 A | | 1/1980 | Lill et al. | 33/203.19 |
| 4,337,581 A | * | 7/1982 | Eck | 33/203.18 |
| 5,029,395 A | | 7/1991 | Brauer et al. | 33/203.18 |
| 5,052,111 A | | 10/1991 | Carter et al. | 33/203.18 |
| 5,598,358 A | * | 1/1997 | Gender et al. | 33/203.18 |
| 6,219,134 B1 | * | 4/2001 | Voeller et al. | 700/279 |

* cited by examiner

Primary Examiner—Christopher W. Fulton
(74) Attorney, Agent, or Firm—Polster, Lieder, Woodruff & Lucchesi

(57) ABSTRACT

A method and apparatus for the calibration of vehicle wheel alignment sensors or optical targets and for the detection and correction of wear or damage to no-compensation type wheel adapters to which the vehicle wheel alignment sensors are attached during a vehicle wheel alignment procedure. A first aspect of the present invention is a method for electronically storing separate calibration values associated with a vehicle wheel alignment sensor or optical target for a variety of types of vehicle wheel adapters. A second aspect of the present invention is a method and apparatus for detecting and compensating for wear or damage to no-compensation type wheel adapters by utilizing a known flat surface against which the contact points of the adapter are placed, any misalignment of the sensor mounting shaft axis from the plane is detected and corrected for, either by adjustment of the contact points or by adjustment of the sensor mounting shaft. An additional aspect of the present invention is the inclusion of more than three contact points on the wheel adapter to which the vehicle wheel alignment sensor is attached to facilitate detection of damage or wear to the wheel adapter by providing a visual indication of the damage or wear when the wheel adapter is placed on the flat surface.

23 Claims, 12 Drawing Sheets

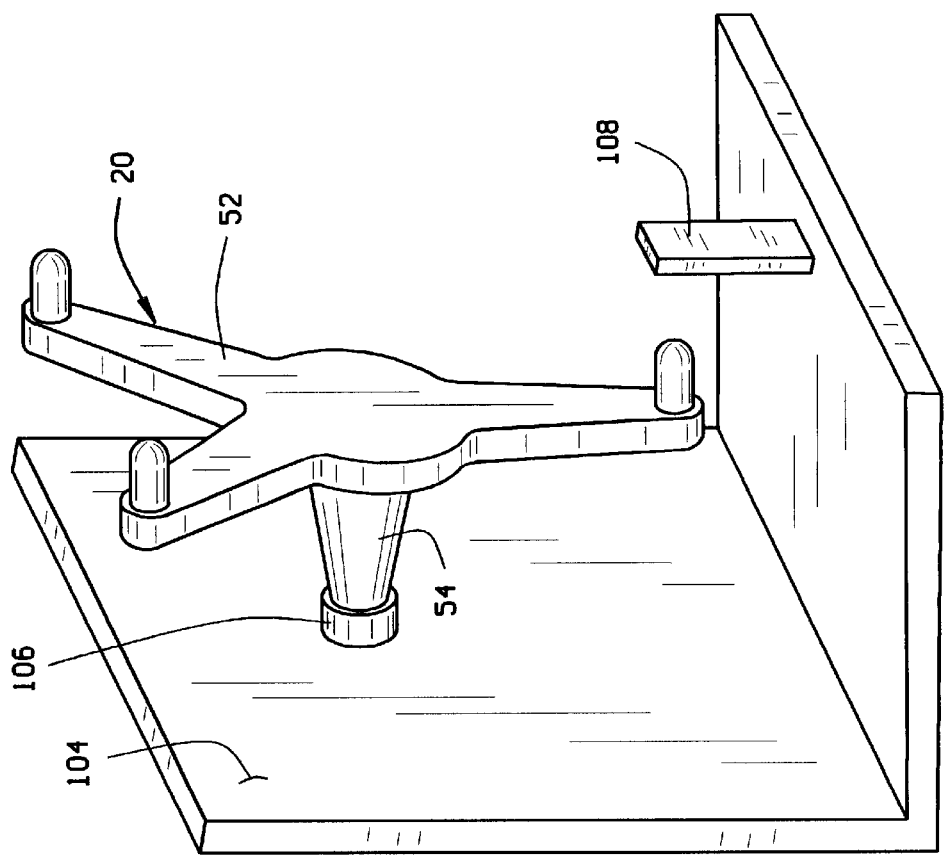
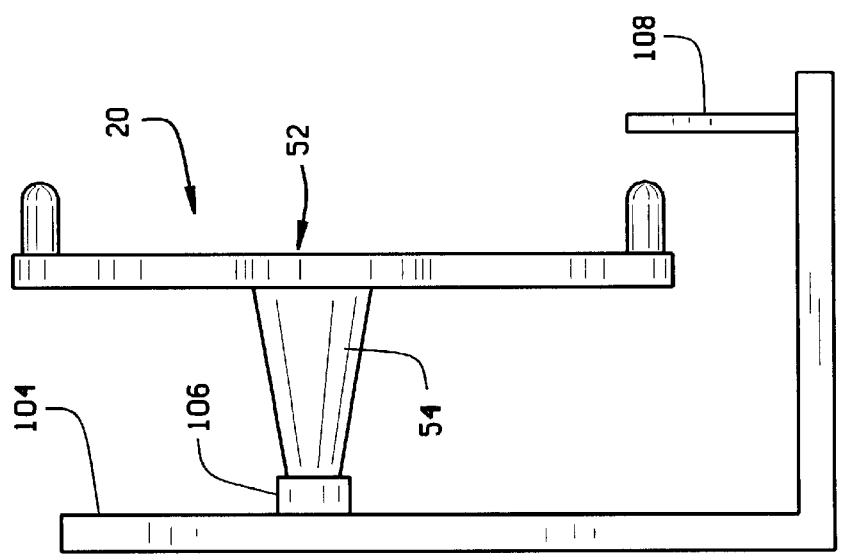

METHOD AND APPARATUS FOR CALIBRATION OF NO-COMPENSATION AND UNIVERSAL WHEEL ADAPTERS UTILIZED IN VEHICLE WHEEL ALIGNMENT PROCEDURES

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The present invention relates generally to vehicle wheel alignment, and specifically to a method for calibrating wheel alignment sensors or optical targets for use with no-compensation and universal wheel adapters, and for the detection and correction of wear or damage to the non-compensation or universal wheel adapters to which the wheel alignment sensors or optical targets are attached during a vehicle wheel alignment procedure.

Conventional wheel alignment systems typically utilize one of two types of wheel adapters to attach alignment sensors or optical targets to each wheel of a vehicle being measured. The first of these, seen in FIG. 1, is referred to as a universal wheel adapter, and is designed to be electronically compensated for runout during each use by rotating the vehicle wheel through a number of different positions and calculating runout from measurements taken at each position. These wheel adapters do not position the alignment sensors or optical targets in any predetermined orientation to the vehicle wheel, but rather, require that the orientation of the wheel alignment sensors or optical target be determined after placement on adapters. In order to determine the orientation of the wheel alignment sensor or optical target relative to the axis of rotation of the wheel, a procedure known as "compensation" or "runout compensation" must be performed. This procedure requires that the wheel (and wheel adapter) be rotated to at least two known positions (typically 180 degrees apart) and that measurements be taken by the alignment sensor or of the optical target at each position. These measurements are then analyzed, and the orientation of the alignment sensor or optical target relative to the axis of rotation of the wheel is determined. This compensates for any differences in orientation between the alignment sensor or optical target and the axis of rotation of the vehicle wheel caused by one or more sources of error. These sources of error include: the indeterminate mounting of the adapter to the wheel; the indeterminate nature of the position and orientation of the features on the alignment adapter support the adapter components, and the points at which the adapter contacts the vehicle wheel.

The second type of wheel adapter, seen in FIGS. 2A and 2B is termed a no-compensation wheel adapter, and is designed to work without the need for any electronic runout compensation. This second type of wheel adapter operates on the assumption that the runout of the vehicle wheel is negligible, and that the manufacturing process of the wheel adapter itself does not induce any additional runout in the system, hence there is no need to rotate the vehicle wheel to different positions to compensate for runout within the system. These no-compensation wheel adapters are configured to minimize orientation errors. By configuring the wheel adapter to contact a vehicle wheel (or other suspension component) in a reliable and repeatable manner, and by choosing points on the vehicle wheel (or other suspension component) that provide a reference which closely represents that plane of rotation of the vehicle wheel, mounting errors incurred by the wheel adapter can be minimized. Similarly, by fabricating the sensor shaft upon which the alignment sensor or optical target is supported by the wheel adapter to be as straight as possible, or at a known angle, as is described in co-pending U.S. patent application Ser. No. 09/196,008, now U.S. Pat. No. 6,134,792 or by calibrating the alignment sensor with the sensor shaft in a fixed position (i.e. in a position wherein rotation is prevented), it is possible to minimize (or theoretically eliminate) any errors due to a lack of straightness in the sensor shaft. Finally, careful fabrication of the wheel adapter itself to minimal tolerances can minimize any position and orientation errors between the sensor shaft mounting points on the wheel adapter and the wheel adapter contact points on the vehicle wheel (or other suspension component).

If all of the above requirements are achieved to a sufficient degree of accuracy (i.e. either electronic runout compensation or minimal manufacturing tolerances), then a conventional wheel alignment system is capable of providing wheel alignment measurements to within the tolerances required for wheel alignment adjustment. However, maintaining these wheel alignment systems in such a serviceable condition and at such tolerances is not always possible, and, in fact, the current condition of a wheel alignment system is not easily determined.

Determination of the condition of a wheel alignment system can be accomplished by evaluating the system as a whole, or by determining the condition of each of the components separately to see if they fall within predetermined specifications. When checking the individual components separately, the condition of the sensor shaft, upon which the alignment sensor or optical target is hung from the wheel adapter, is determined by rotating the sensor shaft and measuring its runout using a dial indicator or similar measuring instrument. Next, in order to assess the condition of a wheel adapter, the orientation of the sensor mounting points on the wheel adapter must be measured relative to the contact points at which the wheel adapter is secured to the vehicle wheel. For a typical wheel adapter, this is determined by measuring the perpendicularity of the sensor shaft mounting point relative to the plane containing the wheel adapter contact points, i.e. determining the relative position of each of the contact points in a direction parallel to the axis of the sensor shaft mounting point. If all of these points are at the same relative position along this axis, then the plane through them is normal to the axis.

A second solution to determining the condition of a wheel alignment system is to provide a means for eliminating any excessive variation of in the geometry of the sensor shaft and the wheel adapter, or by providing a means for accounting for such variation. If the wheel alignment sensor is calibrated by methods known in the art with the sensor shaft in the position in which it is intended to be used, the degree of straightness of the shaft is accounted for, and a separate determination of the runout of the sensor shaft is not necessary. However, this is an acceptable solution only in the case where the shaft can remain in the same fixed position during both the calibration process and its use in a wheel alignment procedure, i.e. the sensor is calibrated in same state in which it will be used.

BRIEF SUMMARY OF THE INVENTION

Among the several objects and advantages of the present invention are:

The provision of a method for compensating for wheel adapter variations associated with wear and damage in no-compensation type wheel adapters wherein the shaft mount axis for receiving a wheel alignment sensor or optical target is adjusted to a predetermined orientation;

The provision of the aforementioned method wherein any condition occurring in the no-compensation wheel adapter which causes the shaft mount axis to be aligned other than normal to the plane containing the contact points for the adapter is compensated for;

The provision of the aforementioned method wherein the contact points of the no-compensation adapter are adjusted in a direction generally parallel to the shaft mount axis until the contact points define a plane perpendicular to the shaft mount axis;

The provision of the aforementioned method wherein the contact points are telescoping, and are adjusted either by extension or retraction;

The provision of the aforementioned method wherein the contact points are threaded, and are adjusted by rotation;

The provision of the aforementioned method wherein the no-compensation wheel adapter is mounted to a shaft arranged perpendicular to a reference surface, and the contact points of the no-compensation adapter are adjusted to contact the reference surface;

The provision of the aforementioned method wherein a reference surface is machined onto the no-compensation adapter to be normal to the sensor mount axis, and the contact points are adjusted to be equidistant from the machined reference surface;

The provision of the aforementioned method utilizing a fixed calibration surface including a flat plate; and The provision of the aforementioned method wherein more than three contact points are utilized by the no-compensation wheel adapter to define a contact plane, the contact plane utilized to identify wear or damage to the no-compensation wheel adapter as well as the detection of damage to vehicle wheel rims to which the no-compensation wheel adapter is mounted.

The provision of a method for electronically calibrating a vehicle wheel alignment sensor for use with either a no-compensation or a universal wheel adapter wherein calibration values for each type of wheel adapter are stored electronically.

Briefly stated, the present invention relates to the calibration of vehicle wheel alignment sensors and to the detection and correction of wear or damage to no-compensation type wheel adapters to which vehicle wheel alignment sensors or optical targets are attached during a vehicle wheel alignment procedure. When performing vehicle wheel alignments, sources of error include variations in the vehicle wheel alignment sensors, optical targets, and in the mounting of the vehicle wheel adapters to which the wheel alignment sensors are attached. Wheel alignment sensors are calibrated differently depending upon whether they are utilized with universal wheel adapters or with no-compensation type wheel adapters. Accordingly, one aspect of the present invention is a method for electronically storing separate calibration values in a memory associated with a vehicle wheel alignment sensors for both types of vehicle wheel adapters. A second aspect of the present invention is a method and apparatus for detecting and compensating for wear or damage to no-compensation type wheel adapters. By utilizing a known flat reference surface, any misalignment of the sensor mounting shaft axis from the plane defined by the contact points of the wheel adapter may be detected and corrected for, either by adjustment of the contact points or by adjustment of the sensor mounting shaft hub. An additional aspect of the present invention is the inclusion of more than three contact points on a wheel adapter. Utilizing more than three contact points facilitates detection of damage or wear to the wheel adapter by providing a visual indication of the damage or wear when the wheel adapter is placed on a flat surface. Similarly, the use of more than three contact points will provide a visual indication of damage to the rim of a vehicle wheel in the event that not all of the contact points engage the wheel rim surface.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 9A is a side view of a second embodiment of a calibration fixture for use with a no-compensation type adapter, illustrated in simplified form;

FIG. 9B is a perspective view of the calibration fixture and no-compensation type adapter of FIG. 9A;

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believe to be the best mode of carrying out the invention.

Figure 1:
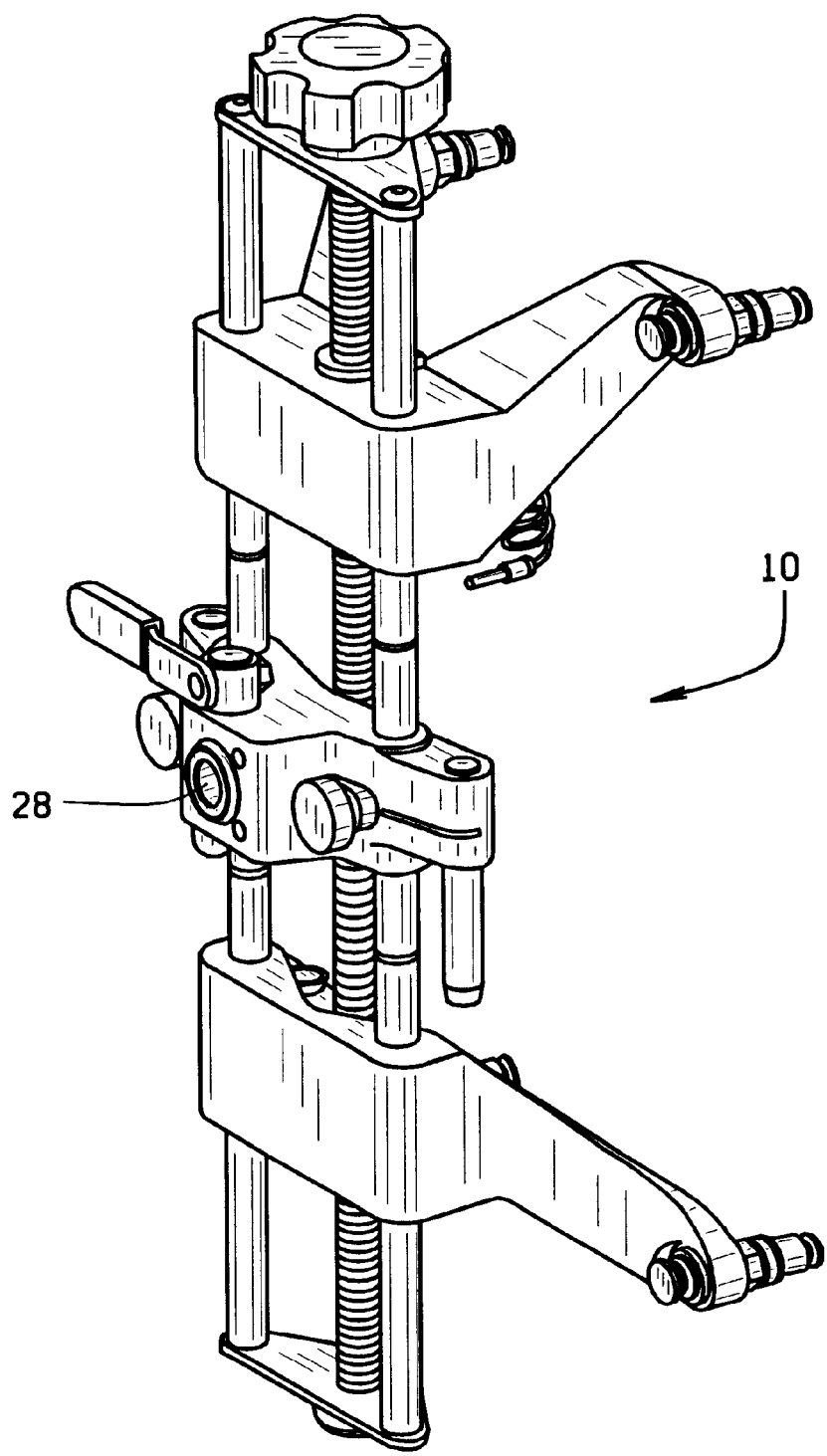
FIG. 1 is an perspective illustration of a prior art universal wheel adapter.

At least two different types of vehicle wheel adapters are utilized to secure vehicle wheel alignment sensors such as conventional angle transducers or optical targets to motor vehicle wheels during an alignment procedure. The first of these, is a universal wheel adapter shown generally by 10 in FIG. 1, which is designed to mount to any vehicle wheel and is used with electronic runout compensation where the wheel is rotated to measure the runout of the wheel itself. The second type of vehicle wheel adapter is known as a no-compensation type wheel adapter, shown generally by 20 in FIGS. 2A and 2B, and is designed to operate without the need for electronic runout compensation. No-compensation type wheel adapters are configured with the assumption that the runout of the vehicle wheel 22 is negligible, and that the manner in which the no-compensation type wheel adapter 20 is mounted to the vehicle wheel 22 does not introduce runout.

Figure 3A:
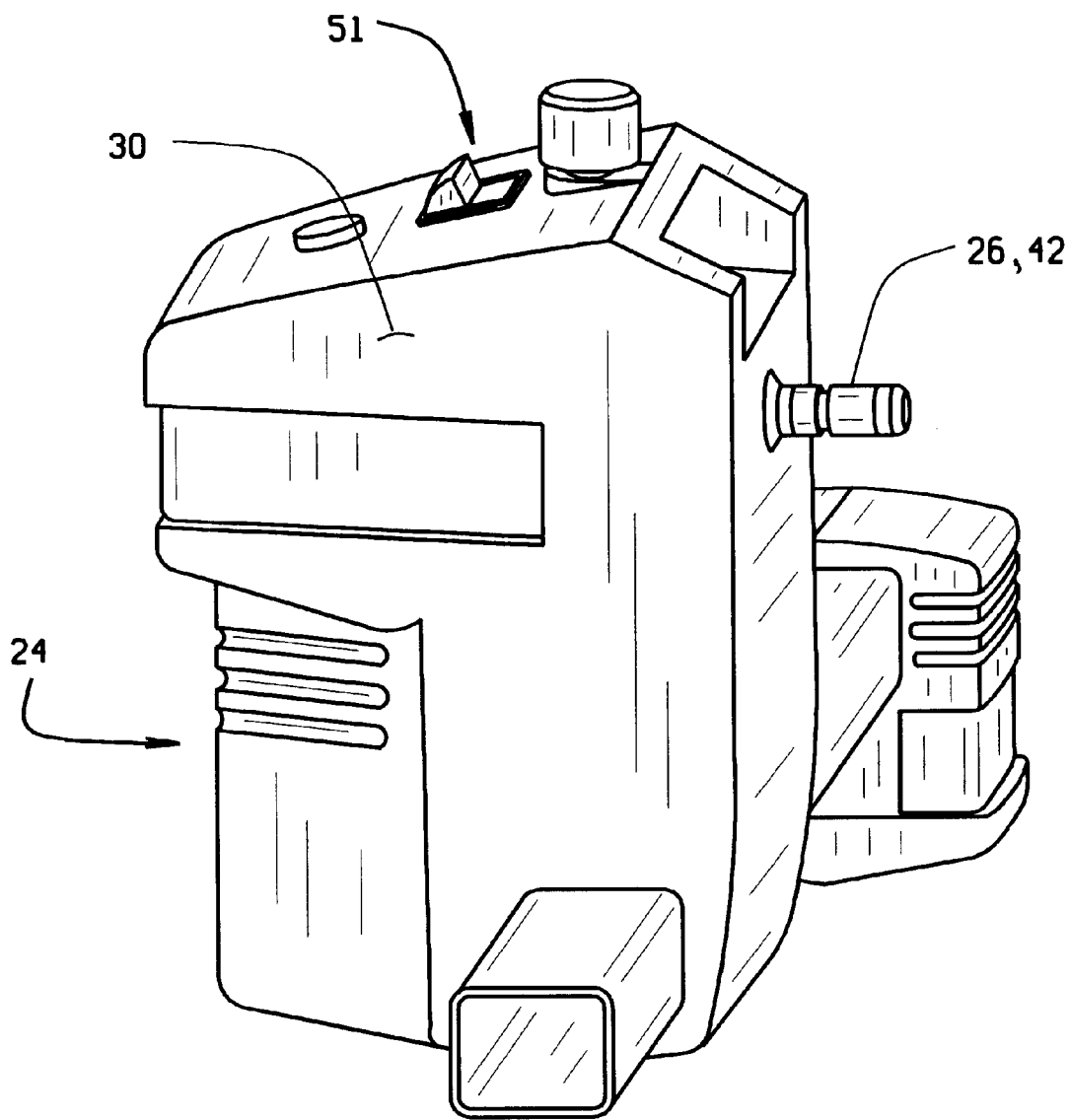
FIG. 3A is a perspective illustration of a prior art vehicle wheel sensor housing.
Figure 3B:
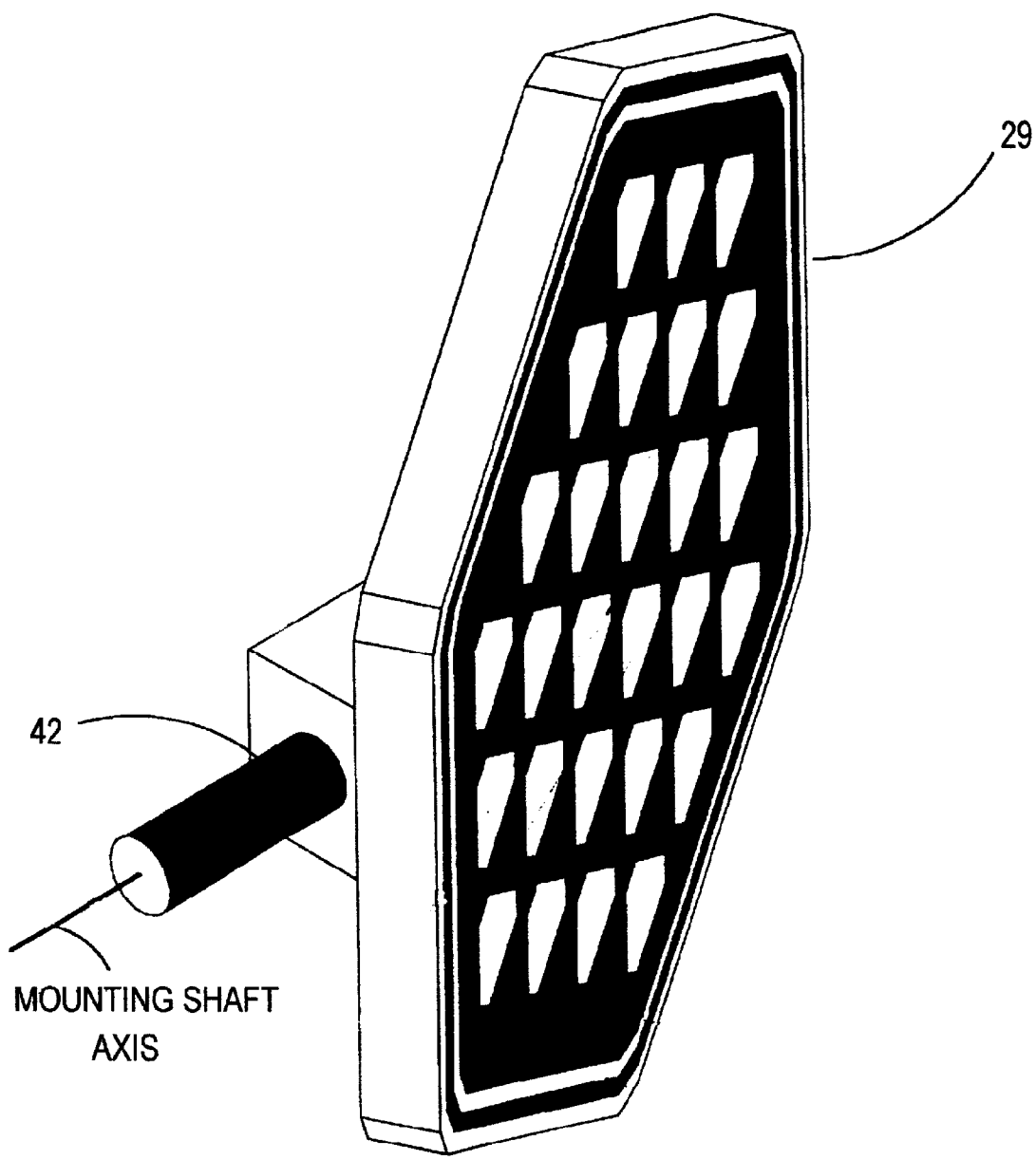
FIG. 3b is a perspective illustration of a prior art vehicle wheel optical target.
Figure 3C:
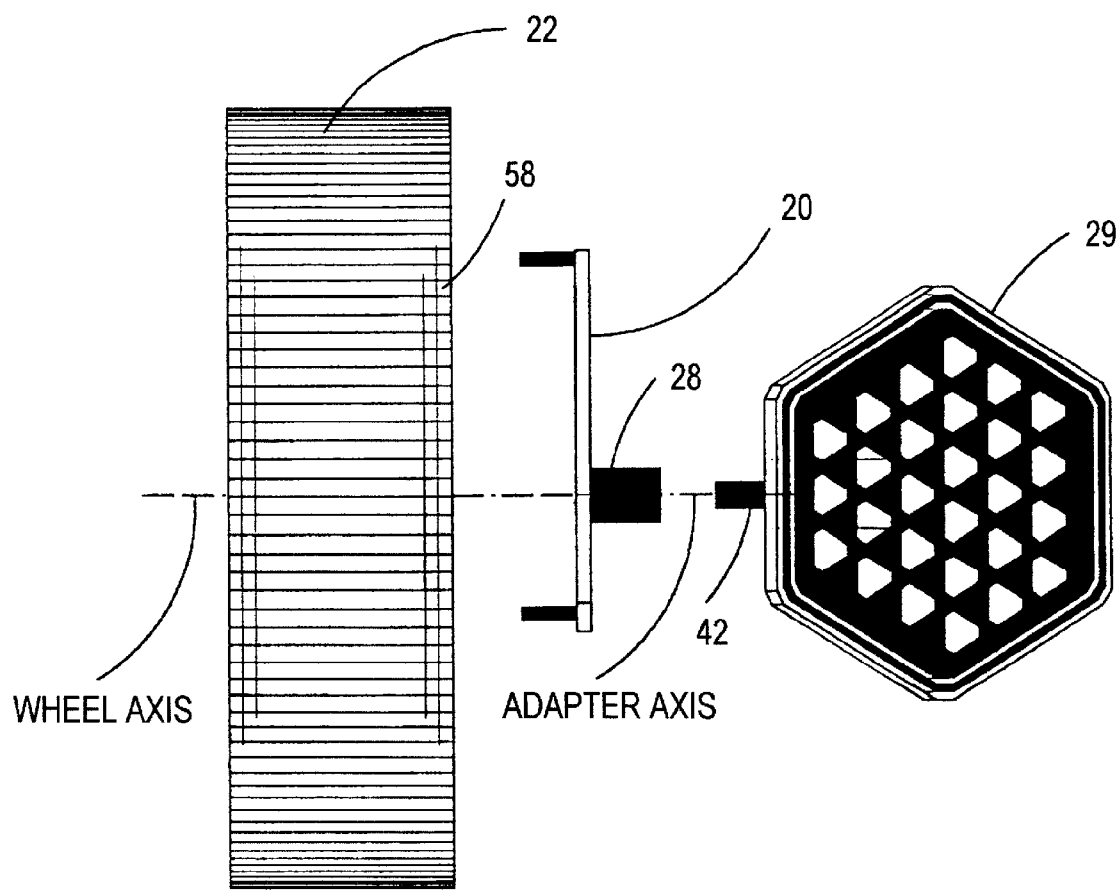
FIG. 3c is an exploded side view of the vehicle wheel optical target of FIG. 3b mounted to a vehicle wheel with an adapter.
Figure 4:
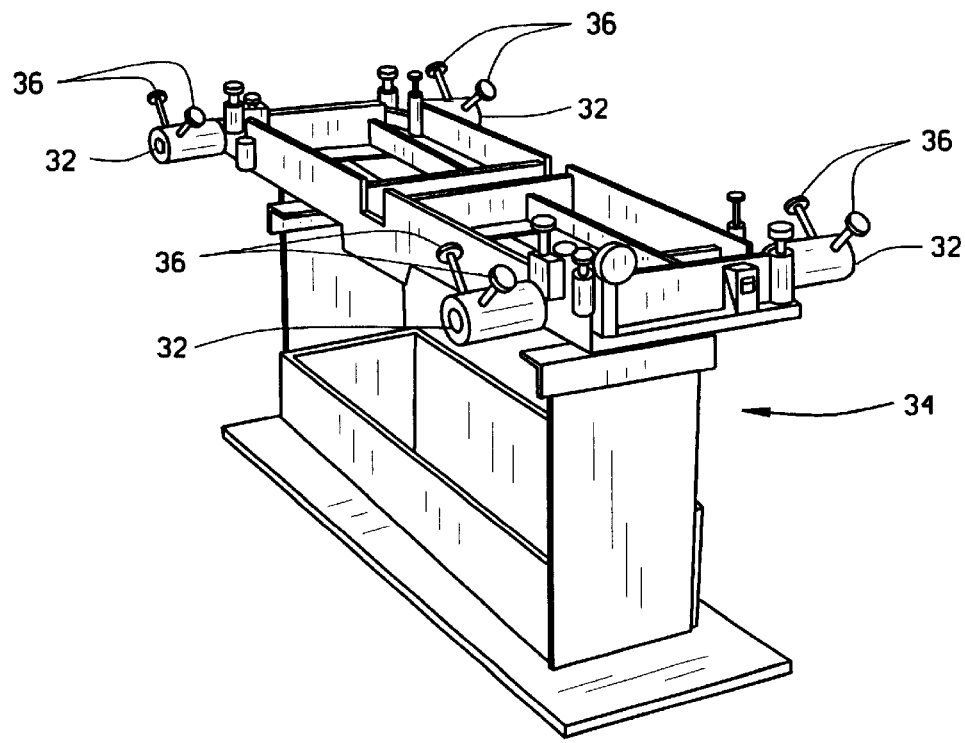
FIG. 4 is a perspective illustration of a calibration fixture for use with vehicle wheel alignment sensors.

Conventional transducer-type vehicle wheel alignment sensors 24, shown in FIG. 3, which are designed for use with the universal type vehicle wheel adapters 10 typically include a rotating shaft (or socket) 26 which attached to a matching socket (or shaft) 28 on the vehicle wheel adapter 10. This shaft (or socket) 26 rotates on bearings (not shown) inside the sensor housing 30. Illustrated in FIGS. 3B and 3C, optical targets 29 may be utilized in place of the conventional transducer-type vehicle wheel alignment sensors 24, and are described together with suitable calibration methods for use therewith in co-pending U.S. patent application Ser. No. 09/196,008, now U.S. Pat. No. 6,134,792, which is herein incorporated by reference. It will be understood by those of ordinary skill in the art that optical targets 29 may be readily substituted for vehicle wheel alignment sensors 24, and as such, may be utilized with the present invention where ever the use of vehicle wheel alignment sensors 24 is called for. To calibrate vehicle wheel alignment sensors 24 for use with universal type vehicle wheel adapters 10, the shaft of the sensor (or socket) 26 is secured into a receiver 32 on a calibration fixture indicated generally by 34 in FIG. 4, and held in place with one or more set screws 36. The receiver is rotated to cause the shaft (or socket) 26 inside the vehicle wheel alignment sensor 24 to rotate, and the runout value induced by the shaft (or socket) 26 is measured. This runout value is stored electronically in a memory of the vehicle wheel alignment sensor 24 or in the memory of the electronic wheel alignment system (not shown). This runout value is utilized to determine a calibration value associated with the shaft (or socket) 26 so that any measured imperfections can be electronically compensated for during use of the vehicle wheel alignment sensor 24 to determine vehicle wheel alignment.

Figure 5:
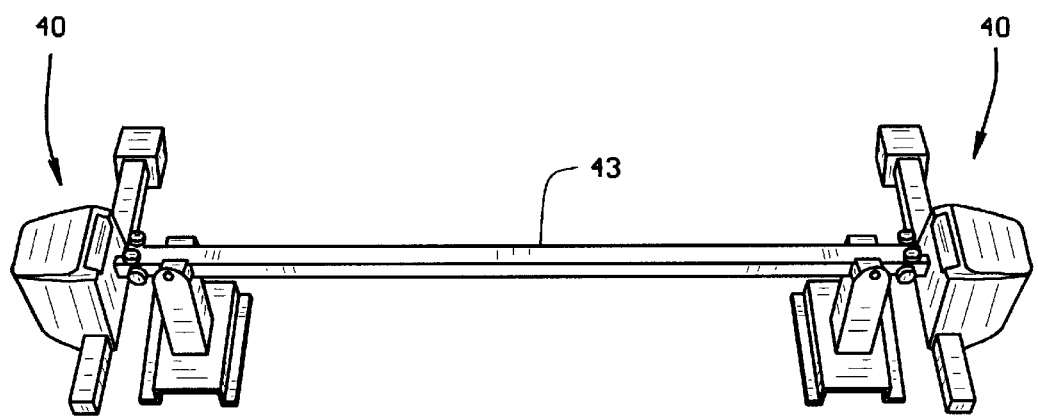
FIG. 5 is a perspective illustration of an alternate calibration fixture for use with vehicle wheel alignment sensors.
Figure 6A:
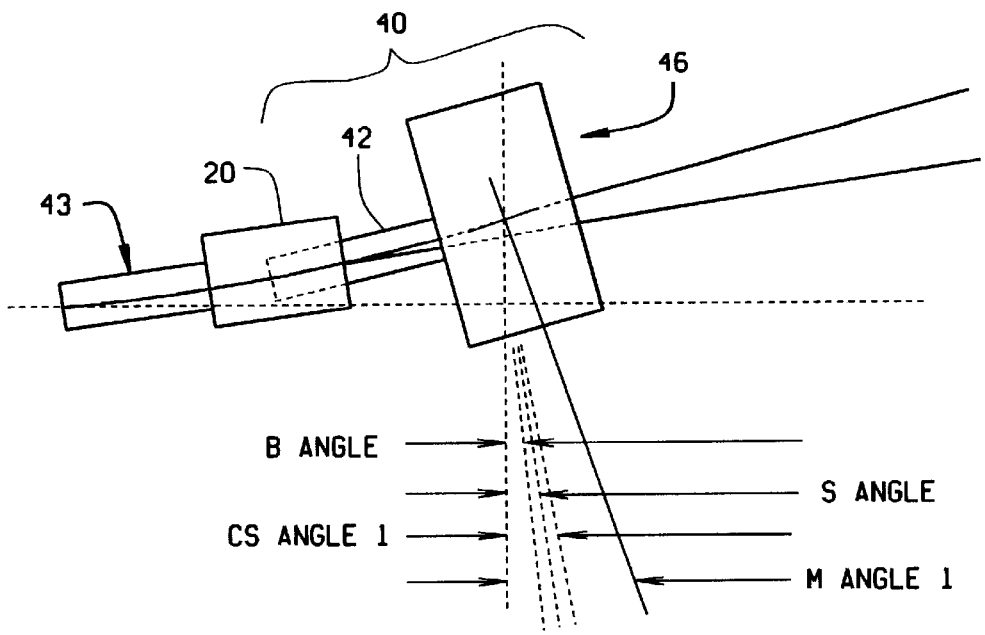
FIG. 6A is a illustration of the angular relationships between the calibration shaft, sensor shaft, and gravity reference transducer of a no-compensation type adapter in a first position during calibration.
Figure 6B:
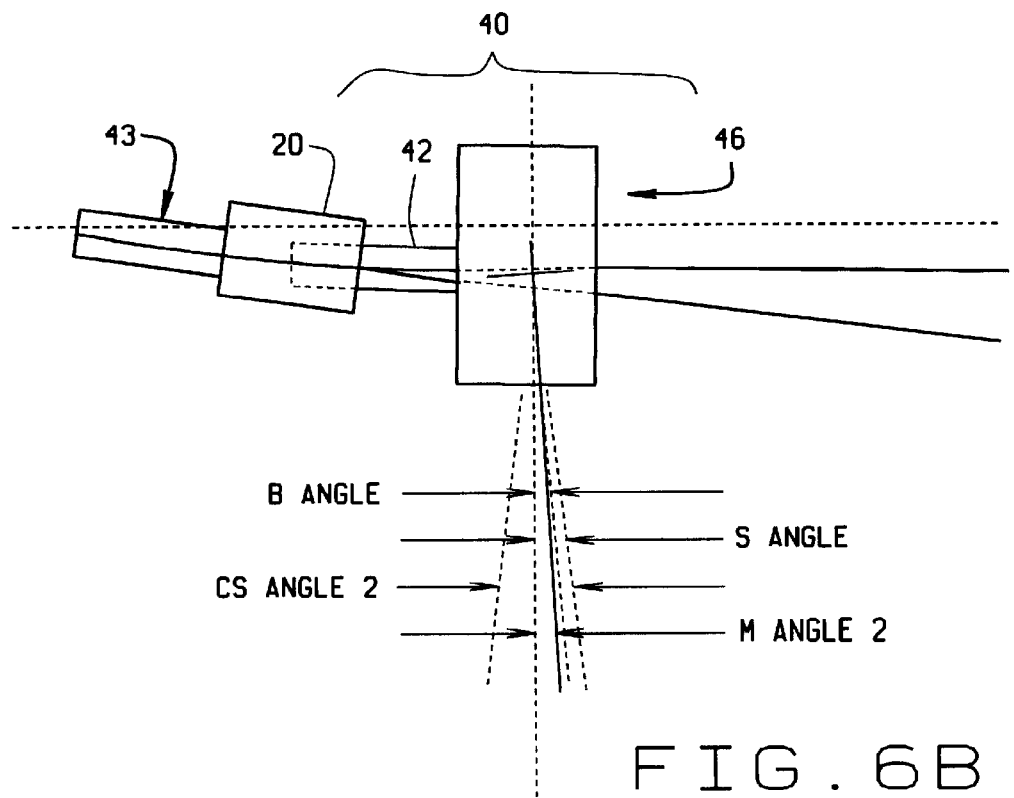
FIG. 6B is an illustration of the angular relationships shown in FIG. 6A, with the no-compensation type adapter in a second position during calibration.

Vehicle wheel alignment sensors 24 which are designed for use with no-compensation type vehicle wheel adapters 20 are identical to those shown in FIG. 3, except that the rotating shaft 26 is replaced with a fixed shaft 42, which protrudes from the sensor housing 44 but which does not rotate. All other aspects of the vehicle wheel alignment sensor designed for use with a no-compensation type vehicle wheel adapter 20 are the same as those found in vehicle wheel alignment sensors 24 designed for use with universal type vehicle wheel adapters 10, and hence will be indicated herein by the same reference numerals. To calibrate vehicle wheel alignment sensors 24 for use with no-compensation type vehicle wheel adapters 20, the fixed shaft 42 is secured to a calibration shaft 43 within a calibration fixture 48 as shown in FIG. 5, and a measurement taken by a gravity referenced transducer within the vehicle wheel alignment sensor 24. Next, the fixed shaft 42 is uncoupled from the calibration fixture 48, and the calibration fixture 48 rotated to a second position. The fixed shaft 42 of the vehicle wheel alignment sensor 24 is re-secured to the calibration fixture 48, and a second measurement taken by the gravity referenced transducer. This process may be repeated for a number of different positions, utilizing alternate sensors available in the vehicle wheel alignment sensors 24, such as toe angle transducers, to obtain a number of different measurements. Once the desired number of measurements from each alternate sensor has been obtained, a calculation is performed to determine a calibration value compensating for any bend or misalignment in the fixed shaft 42 of the vehicle wheel alignment sensor 24. For example, a calibration procedure is to take two measurements. The initial measurement is taken at an arbitrary position (FIG. 6A, Position 1). The second measurement is taken after rotating the calibration shaft 43 to 180 degrees from the initial position (FIG. 6B, Position 2). In this case, for use with a no-compensation adapter, the sensor shaft 42 remains fixed relative to the calibration shaft 43.

BAngle=Angle at which the gravity referenced transducer varies from true zero

SAngle=Angle due to misaligned fixed shaft 42

CSAngle1=Angle due to imperfect calibration shaft 43 at position 1

CSAngle2=Angle due to imperfect calibration shaft 43 at position 2

MAngle1=Angle measured by gravity referenced transducer at position 1

Mangle2=Angle measured by gravity referenced transducer at position 2

Kz(no-comp)=Computed calibration data for use with no-compensation adapters 20

In this example CSAngle2 is measured with the calibration shaft 43 rotated 180 degrees from CSAngle1 therefore CSAngle2=−CSAngle1.

(1) MAngle1=BAngle+SAngle+CSAngle1

(2) MAngle2=BAngle+SAngle+CSAngle2

(3) Kz(no-comp)=(MAngle1+MAngle2)/2

(4) Kz(no-comp)=((2*BAngle)+(2*SAngle)+CSAngle1+CSAngle2)/2

(5) Kz(no-comp)=((2*BAngle)+(2*SAngle)+CSAngle1+(−CSAngle1))/2

(6) Kz(no-comp)=BAngle+SAngle

Figure 7A:
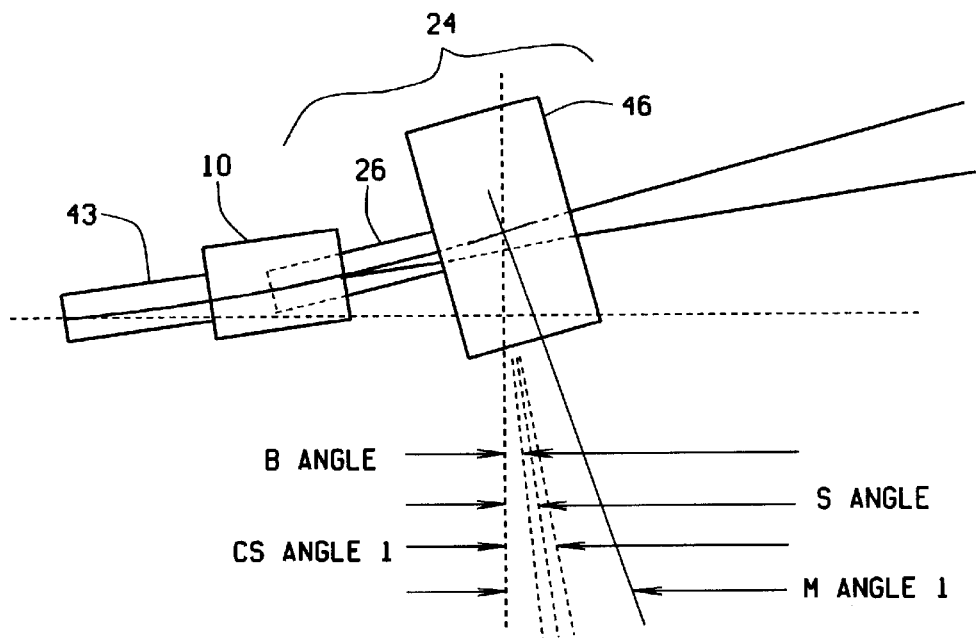
FIG. 7A is an illustration of the angular relationships between the calibration shaft, sensor shaft, and gravity reference transducer of a universal type adapter in a first position, identical to that of FIG. 6A, during calibration.
Figure 7B:
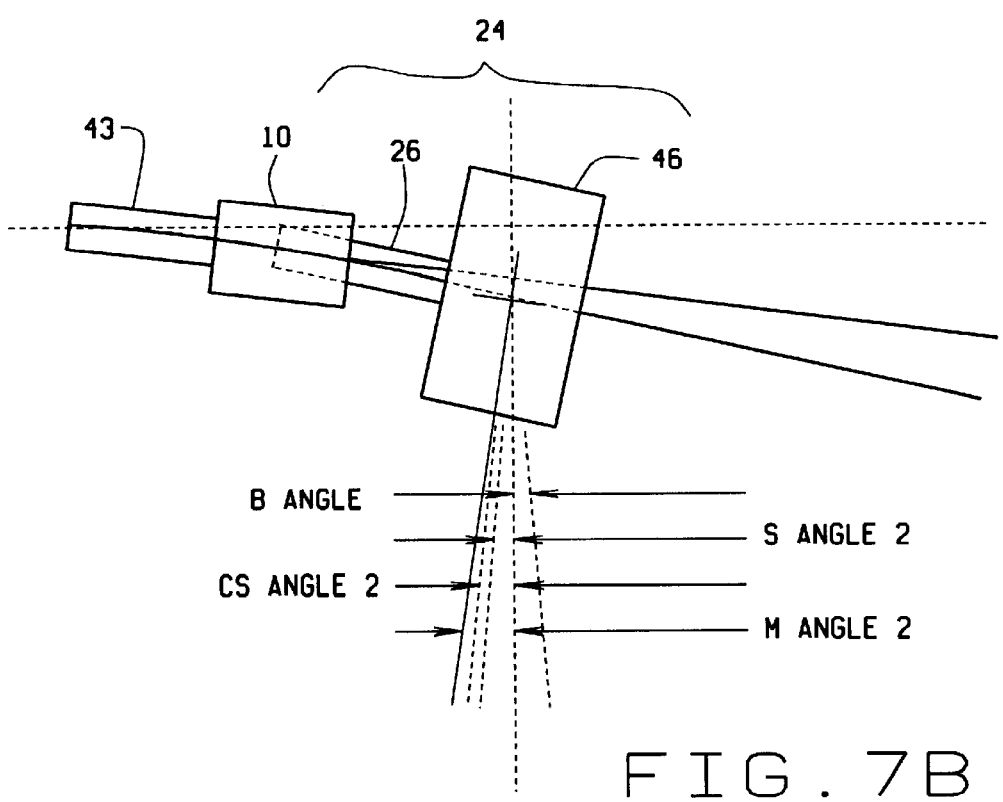
FIG. 7B is an illustration of the angular relationships shown in FIG. 7A, with the universal type adapter in a second position during calibration.

The above example for calibration of the sensor 24 for use with a universal wheel adapter 10 requiring compensation would be as follows. The initial measurement by the gravity referenced transducer at an arbitrary position (FIG. 7A, Position 1 which may be identical to FIG. 6A, Position 1). The second measurement is taken after rotating the calibration shaft 43 to 180 degrees from the initial position (FIG. 7B, Position 2). In this case, for use with a universal type wheel adapter, the sensor shaft 26 rotates with the calibration shaft 43.

BAngle=Angle at which gravity referenced transducer varies from true zero

SAngle1=Angle due to misaligned shaft 26 at position 1

SAngle2=Angle due to misaligned shaft 26 at position 2

CSAngle1=Angle due to imperfect calibration shaft 43 at position 1

CSAngle2=Angle due to imperfect calibration shaft 43 at position 2

MAngle1=Angle measured by gravity referenced transducer at position 1

Mangle2=Angle measured by gravity referenced transducer at position 2

Kz(comp)=Computed calibration data for use with universal wheel adapter 10 requiring compensation.

In this example CSAngle2 is measured with the calibration shaft 43 rotated 180 degrees from CSAngle1 therefore CSAngle2=−CSAngle1. This also applies to the shaft angle SAngle2=−SAngle1.

(7) MAngle1=BAngle+SAngle1+CSAngle 1

(8) MAngle2=BAngle+SAngle2+CSAngle 2

(9) Kz(comp)=(MAngle1+MAngle2)/2

(10) Kz(comp)=((2*BAngle)+SAngle1+SAngle2+CSAngle1+CSAngle2)/2

(11) Kz(comp)=((2*BAngle)+SAngle1+(−SAngle1)+CSAngle1+(−CSAngle2))/2

(12) Kz(comp)=BAngle

The calibration value (6) or (12) is stored electronically in a memory of the vehicle wheel alignment sensor 24, or in the wheel alignment system memory (not shown) so that any imperfections in the fixed shaft 26 can be electronically compensated for during vehicle wheel alignment measurements. A key distinction between the calibration process for vehicle wheel alignment sensors 24 for use with universal type vehicle wheel adapters 10 and vehicle wheel alignment sensors for use with no-compensation type vehicle wheel adapters 20 is that the mounting shaft 26 of the vehicle wheel alignment sensor 24 is rotated in the universal adapter 10, and the mounting shaft 42 remains fixed in the no-compensation adapter 20. This assumes that the sensor shaft 42 is not perfectly straight and that there are errors which must be corrected for.

Vehicle wheel alignment sensors 24 having rotating shafts 26 for use with universal type vehicle wheel adapters 10 additionally include a locking cam or clamp (not shown) capable of securing the rotating shaft 26 against rotation. Hence, by locking the rotating shaft 26, a vehicle wheel alignment sensor 24 designed for use with a universal type vehicle wheel adapter 10 may be utilized with a no-compensation type vehicle wheel adapter 20. However, the calibration values stored in association with a vehicle wheel alignment sensor 24 for use with a universal type vehicle wheel adapter 10 will not correctly compensate for bend or misalignment of the rotating shaft 26 secured in a fixed position for use with a no-compensation type vehicle wheel adapter 20.

Accordingly, in one embodiment, the present invention facilitates the interchangeability of vehicle wheel alignment sensors 24 between various types of vehicle wheel adapters 10, 20 by providing electronic memory in communication with a wheel alignment console or computer capable of storing a number of different calibration values. For each type of vehicle wheel adapter the vehicle wheel alignment sensor 24 is used with, a separate calibration value or set of calibration data is either stored in an electronic memory of the sensor 24 or in the memory of the wheel alignment system. As seen on FIG. 3, a selector switch or selector button 51 is provided on the vehicle wheel alignment sensors 24 or in the wheel alignment system or software to allow an operator to either store or recall specific calibration data associated with a specific type of vehicle wheel adapter 10, 20. During calibration, the operator associates the type of wheel adapter 10, 20 with which the wheel alignment sensor is being calibrated to the stored calibration values in the memory. Later, during use, the operator uses the selector switch or selector button 51 to identify the type of wheel adapter 10, 20 to which the wheel alignment sensor 24 is attached, thereby recalling the stored calibration data for that type of wheel adapter from the electronic memory of the wheel alignment sensor.

Figure 2A:
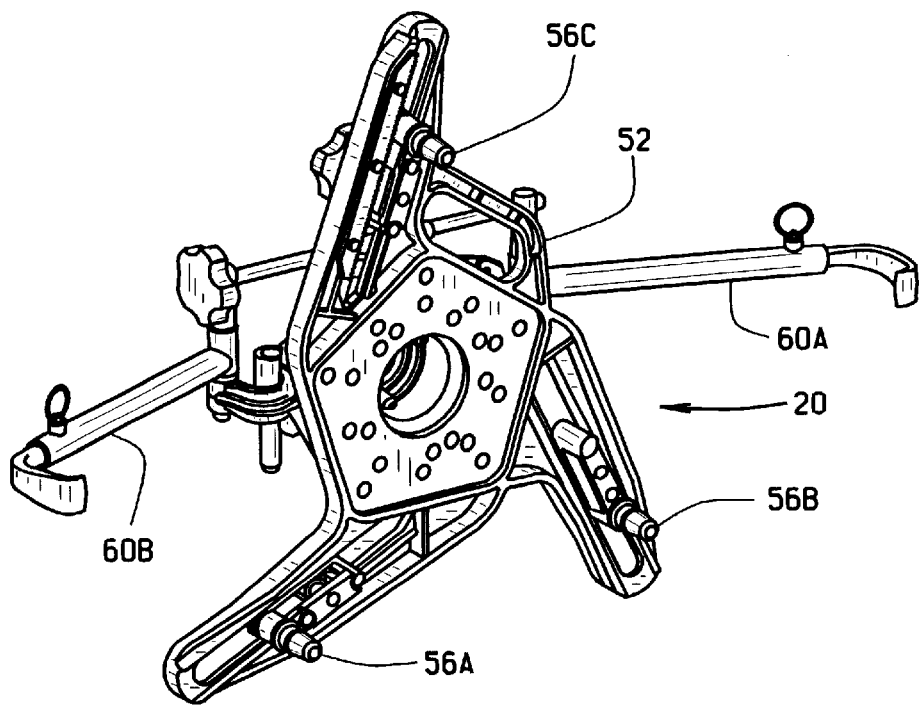
FIG. 2A is a perspective illustration of the wheel side of a prior art no-compensation wheel adapter.
Figure 2B:
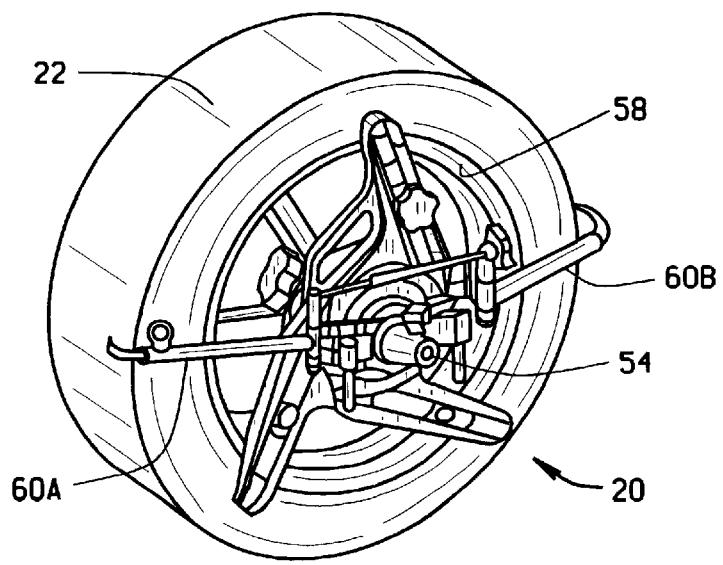
FIG. 2B is a perspective illustration of the no-compensation wheel adapter of FIG. 2A mounted to a vehicle wheel.

In another embodiment, the present invention provides an apparatus and method for detecting and compensating for wear or damage to the no-compensation type wheel adapters 20 utilized with the vehicle wheel alignment sensors 24. The no-compensation type wheel adapter 20, as illustrated in FIGS. 2A and 2B, includes a frame member 52, a shaft receiving socket having an axial bore (or alternatively, a sensor mount shaft) 54, and three contact points 56A–56C mounted to the frame member 52 on an opposite side from the shaft receiving socket or sensor mount shaft 54. During use, the no-compensation type wheel adapter 20 is placed against the wheel rim 58 of a vehicle wheel 22 such that the three contact points 56A–56C abut the wheel rim 58. A pair of tire clamping arms 60A, 60B extending laterally from the frame member 52 are then tightened against the vehicle wheel 22 mounted on the wheel rim 58, holding the no-compensation type wheel adapter 20 securely against the wheel rim 58. The vehicle wheel alignment sensor 24 is then attached to the no-compensation type wheel adapter 20 in the conventional manner by either inserting the fixed shaft 42 of the wheel alignment sensor 24 into the shaft receiving socket 54 of the wheel adapter 20, or by alternatively fitting the sensor mount shaft of the wheel adapter into the socket of the vehicle wheel alignment sensor. It is assumed for no-compensation type wheel adapters 20 that the sensor mount shaft or the axial bore of the shaft receiving socket 54 is aligned perpendicular to a plane defined by the three contact points 56A–56C held against the wheel rim 58. However, if the no-compensation type wheel adapter 20 has become worn or damaged, this assumption may no longer be true, resulting in the introduction of an error into subsequent wheel alignment calculations.

Figure 8B:
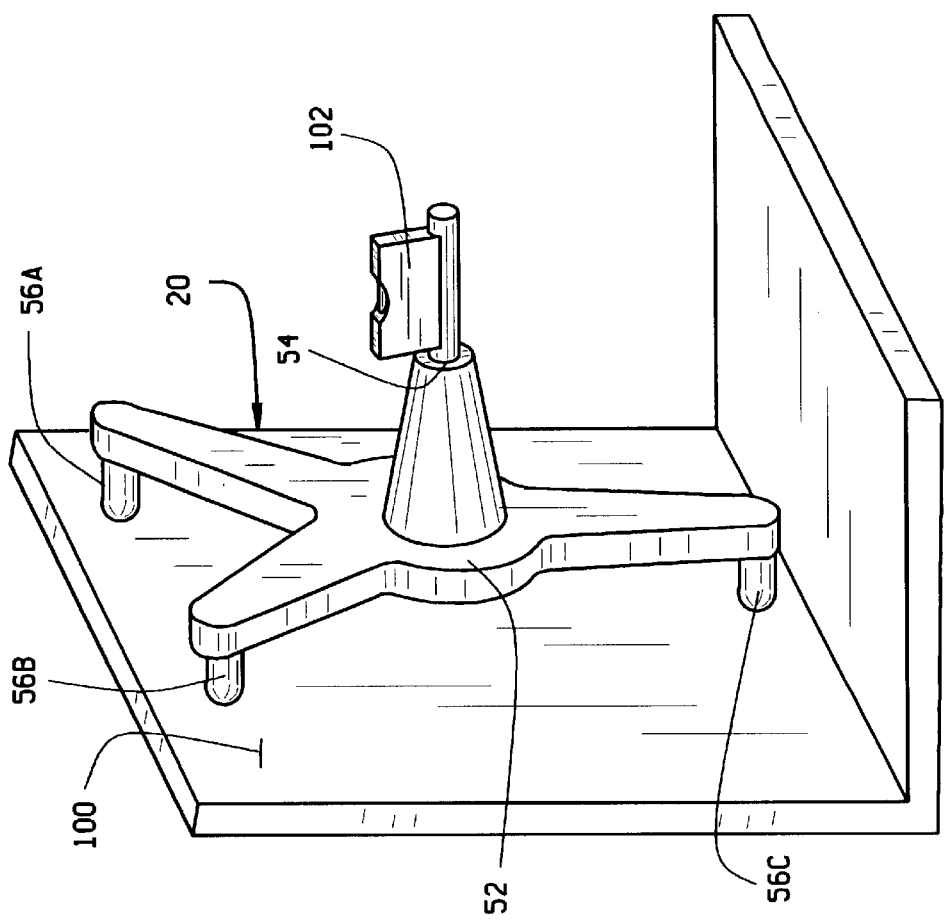
FIG. 8B is a perspective view of the calibration fixture and no-compensation type adapter of FIG. 8A.
Figure 8A:
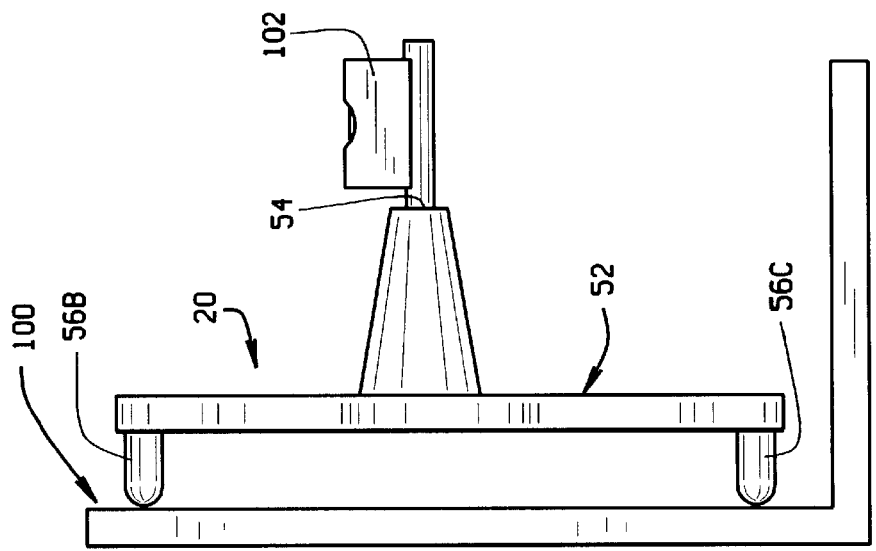
FIG. 8A is a side view of one embodiment of a calibration fixture for use with a no-compensation type adapter, illustrated in simplified form.

Turning to FIGS. 8A and 8B, a method of the present invention for detecting and compensating for wear or damage to no-compensation type wheel adapters 20 utilizes a vertically planar reference surface 100. The three contact points 56A–56C of a no-compensation type wheel adapter 20 are placed against the reference surface 100, and the level alignment of the sensor mount shaft or axial bore of the receiving socket 54 is measured relative to the vertical plane defined by of the reference surface 100. This is preferably done by means of a bubble level 102 secured in the sensor mount shaft or axial bore of the receiving socket 54, however, any suitable measuring apparatus or method may be used. Those skilled in the art will readily recognize that different measuring apparatus or methods may be particularly suitable for use if the reference surface 100 is orientated in any position other than vertical. If the alignment is found to be out of level, i.e. not perpendicular relative to the reference surface 100, the sensor mount shaft or receiving socket 54 is adjusted until a level alignment is achieved. Next, the no-compensation type wheel adapter 20 is rotated to place the three contact points 56A–56C against the reference surface 100 at different locations, and the alignment measurement and adjustment process repeated. This process is repeated until the no-compensation type wheel adapter 20 may be rotated to any position with the three contact points 56A–56C held against the reference surface 100 and the sensor mount shaft or axial bore of the receiving socket 54 remains level, or perpendicular thereto.

Alternatively to adjusting the sensor mount shaft or the receiving socket 54, one or more of the contact points 56A–56C may be adjusted to alter the alignment of the sensor mount shaft or the receiving socket 54. For example, the contact points 56A–56C may be threadedly connected to the frame member 52, such that threading the contact points 56A–56C results in axial movement thereof. The contact points 56A–56C may alternatively be of a telescoping design, such that extension or retraction of the contact points 56A–56C results in alterations in the alignment of the sensor mount shaft or the receiving socket 54.

In an alternative design and method, illustrated in FIGS. 9A and 9B, a calibration fixture 103 for the no-compensation type wheel adapter 20 comprises a planar reference surface 104 with a adapter mounting shaft 106 secured normal thereto. The no-compensation type wheel adapter 20 is secured to the adapter mounting shaft 106 coaxially with the axial bore of the sensor receiving socket or coaxially with the sensor mounting shaft 54. Next, the distances between each of the three contact points 56A–56C and a reference plane defined by the reference surface 104 or other established reference 108 are measured and compared. If any deviation is detected between the measured distances, the no-compensation type wheel adapter 20 has suffered wear or damage. To compensate for the wear or damage, the position of at least one of the three contact points 56A–56C is adjusted as described above, and the distances between each of the contact points 56A–56C and the reference surface 104 or established reference 108 re-measured and compared. This process is repeated until the measured distances between each contact points 56A–56C and the reference surface 104 or established reference 108 are within specified tolerances for wheel alignment purposes.

Figure 10B:
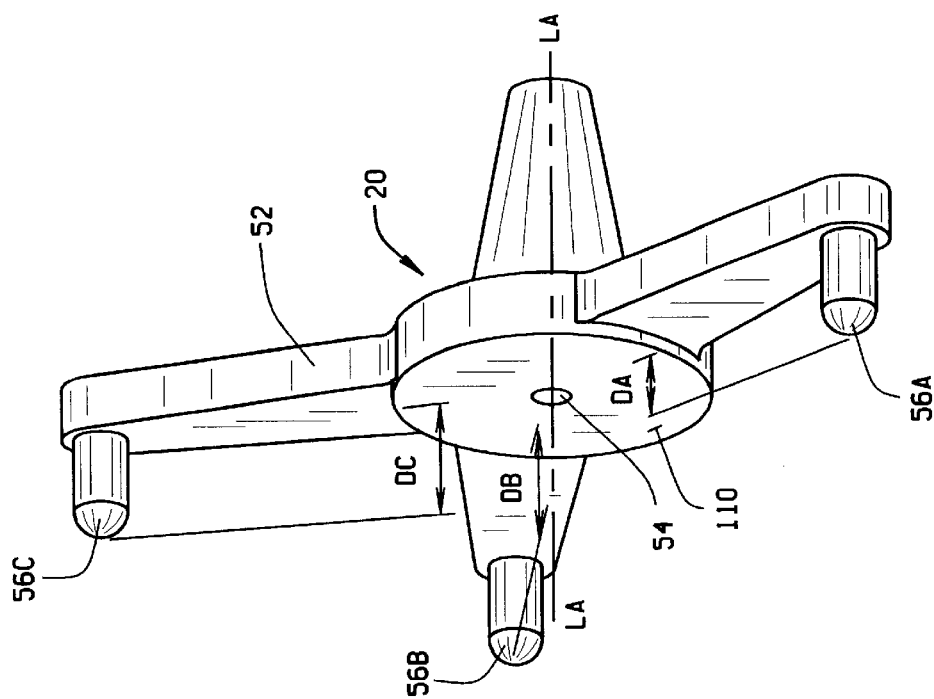
FIG. 10B is a perspective view of the integral calibration reference surface and no-compensation type adapter of FIG. 10A.
Figure 10A:
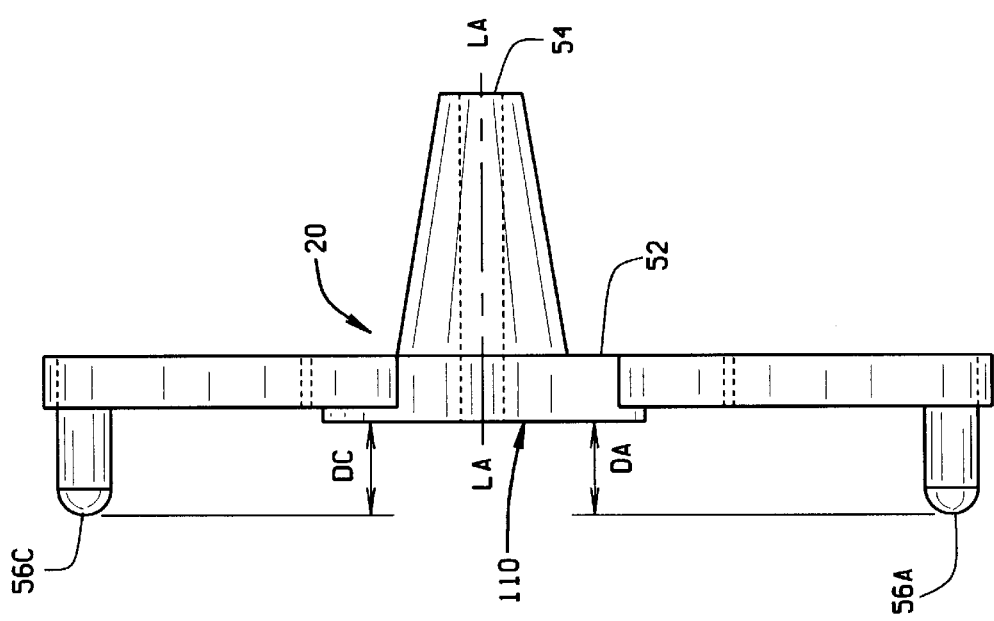
FIG. 10A is a side view of a third embodiment of a integral calibration reference surface for use with a no-compensation type adapter, illustrated in simplified form.

In a second alternative design and method, illustrated in FIGS. 10A and 10B, the need for a calibration fixture is eliminated by the machining of a reference surface 110 normal to the longitudinal axis LA of the sensor mounting shaft or the axial bore of the sensor receiving socket 54 on the frame member 52 of the no-compensation type wheel adapter 20. The distances DA, DB, and DC between each of the three contact points 56A–56C and the plane defined by the reference surface 110 are measured and compared. If any deviation is detected between the measured distances, the no-compensation type wheel adapter 20 has suffered wear or damage. To compensate for the wear or damage, the position of at least one of the three contact points 56A–56C is adjusted as described above, and the distances DA, DB, and DC between each of the contact points 56A–56C and the plane of the reference surface 110 re-measured and compared. This process is repeated until the measured distances DA, DB, and DC between each contact point 56A–56C and the plane of the reference surface 110 are within specified tolerances for wheel alignment purposes.

Figure 11:
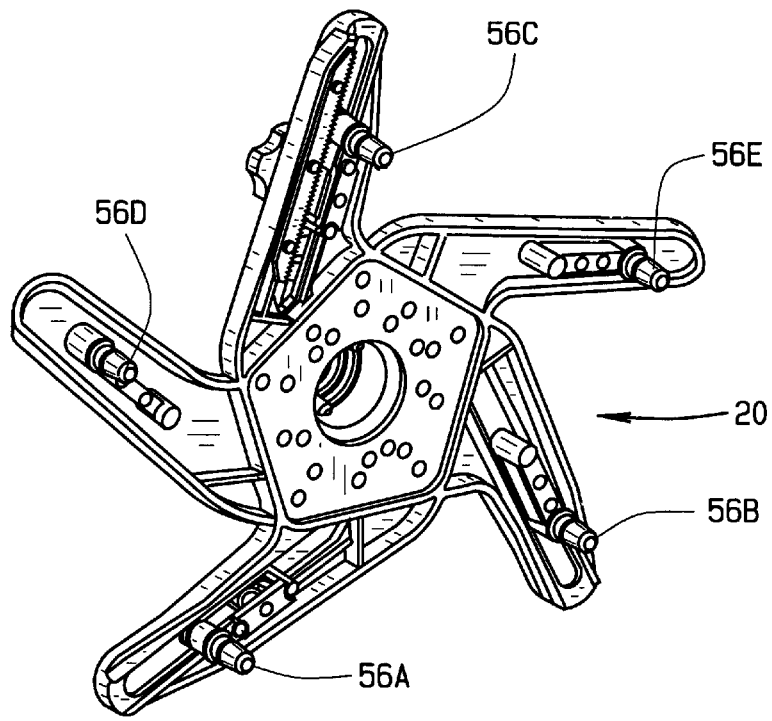
FIG. 11 is an illustration of an alternate embodiment of the no-compensation type wheel adapter of present invention, employing more than three contact points.
Figure 12:
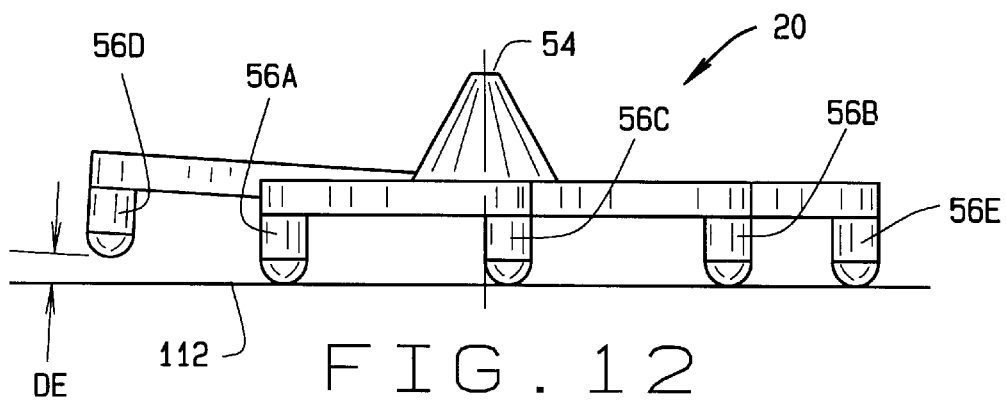
FIG. 12 is a side view of the alternate embodiment no-compensation type wheel adapter of FIG. 11, wherein one contact point is not in contact with a reference surface, indicating wear or damage.
Figure 13:
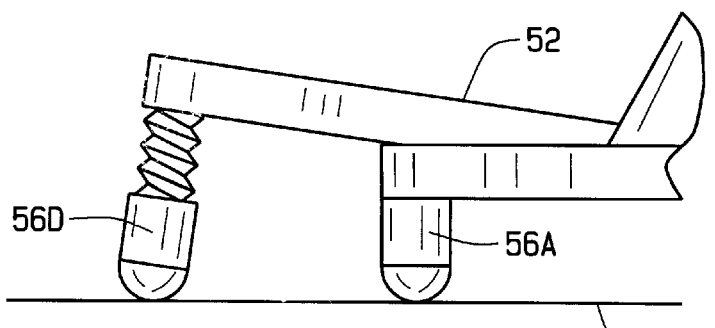

No-compensation type wheel adapters traditionally include only three contact points 56A–56C to seat against the wheel rim 58 because that is the minimum number of points which are mathematically required to define a planar surface. As is described above, for a no-compensation type wheel adapter 20 to function properly, the sensor mounting shaft or the axial bore of the sensor receiving socket 54 must remain normal to the plane defined by the three contact points 56A–56C. In a third alternative design and method illustrated in FIGS. 11 and 12, a no-compensation type wheel adapter 20 is modified to include one or more additional contact points 56D, 56E mounted to the frame member 52 for seating against the vehicle wheel rim. The inclusion of additional contact points 56D, 56E serves as an indicator that the modified no-compensation type wheel adapter 112 has suffered wear or damage, if, when placed on a planar surface 112, one or more of the contact points 56A–56E does not seat against the planar surface, but are held apart from the planar surface by more than a predetermined tolerance DE. In the event such a condition is detected, the modified no-compensation type wheel adapter 112 may be adjusted by the calibration apparatus or methods described above to bring all of the contact points 56A–56E into proper position or tolerance.

Furthermore, if a modified no-compensation type wheel adapter 112 of the present invention which is known to be calibrated to within required tolerances is seated against a wheel rim 58, and one or more of the contact points 56A–56E is held apart from contact with the wheel rim 58 by more than the required or predetermined tolerance, it is immediately known that the wheel rim 58 is bent or damaged, and accordingly is not defining a planar surface. Bent or damaged wheel rims 58 can affect measurements of vehicle wheel alignment calculations, and accordingly, the identification of bent or damaged wheel rims 58 is critical when utilizing no-compensation type wheel adapters 20, 112.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A method for preparing a vehicle wheel alignment sensor including a controller for use, comprising the steps of:

computing a first set of calibration values associated with the mounting of said wheel alignment sensor on a first type of vehicle wheel adapter;

storing said first set of calibration values;

computing at least one additional set of calibration values associated with the mounting of said wheel alignment sensor on at least one additional type of vehicle wheel adapter; and storing said at least one additional set of calibration values.

2. The method of claim 1 further including the step of recalling said first set of stored calibration values in response to the use of said wheel alignment sensor with a vehicle wheel adapter of said first type.

3. The method of claim 1 further including the step of recalling said stored at least one additional set of calibration values in response to the use of said wheel alignment sensor with a vehicle wheel adapter of said at least one additional type.

4. The method of claim 1 wherein said first type of vehicle wheel adapter is a universal-type wheel adapter.

5. The method of claim 1 wherein said at least one additional type of vehicle wheel adapter is a no-compensation type wheel adapter.

6. A vehicle wheel alignment system including a wheel alignment console and at least one vehicle wheel alignment sensor, the system comprising:
   a controller located in said wheel alignment console configured to receive input and determine vehicle wheel alignment parameters;
   a memory in communication with said controller, said memory configured to store a plurality of calibration values each associated with the at least one vehicle wheel alignment sensor and a type of vehicle wheel adapter; and
   said controller configured responsive to input identifying a type of vehicle wheel adapter on which the at least one vehicle wheel alignment sensor is secured, to utilize one of said stored plurality of calibration values from said memory to compensate measurements received from the at least one wheel alignment sensor.

7. A method for determining vehicle wheel alignment parameters of a motor vehicle having a plurality of vehicle wheels, comprising the steps of:
   for each of said plurality of vehicle wheels, mounting thereon an individual vehicle wheel adapter, each of said individual wheel adapters of a predetermined type;
   attaching to each individual vehicle wheel adapter a corresponding one of a plurality of vehicle wheel alignment sensors;
   recalling, for each of said plurality of vehicle wheel alignment sensors, a calibration value associated with said predetermined type of vehicle wheel adapter to which said vehicle wheel alignment sensor is attached; and
   utilizing said recalled calibration values in obtaining vehicle wheel alignment parameters from each of said vehicle wheel alignment sensors.

8. A vehicle wheel adapter for use with vehicle wheel alignment sensors, comprising:
   a support frame;
   a sensor mount secured to said support frame, said sensor mount configured to connect with a vehicle wheel alignment sensor; and
   four or more contact points secured to an opposite side of said support frame from said sensor mount, wherein a position of at least one of said contact points is axially adjustable, allowing said four or more contact points to be positioned within a predetermined tolerance to a reference plane.

9. A method for detecting vehicle wheel rim variation utilizing a vehicle wheel adapter having four or more contact points positioned to within predetermined tolerance to a plane, comprising the steps of:
   mounting said vehicle wheel adapter to said vehicle wheel rim;
   observing positioning of each of said four or more contact points relative to said vehicle wheel rim; and
   comparing said observed positioning for each of said four or more contact points to said predetermined tolerance, one or more observed positions being located outside of said predetermined tolerance indicative of vehicle wheel rim variation.

10. An apparatus for detecting wear or damage to a no-compensation type vehicle wheel adapter having a sensor mounting shaft socket and a plurality of adjustable contact points for use with vehicle wheel alignment sensors, comprising:
    a known planar surface; and
    an adapter mounting shaft secured normal to said known planar-surface, said adapter mounting shaft socket configured to receive a no-compensation type vehicle wheel adapter and to secure the adjustable contact points relative to said known planar surface, whereby variations in displacement between each of the adjustable contact points and said known planar surface are observable.

11. A method for observing wear or damage to a no-compensation type vehicle wheel adapter having a sensor mounting shaft socket and a plurality of contact points for use with vehicle wheel alignment sensors, the method comprising the steps of:
    holding said plurality of adjustable contact points in fixed relation with a planar surface; and
    observing variation in spacing between said vehicle wheel adapter contact points relative to said planar surface, said observed variation in spacing exceeding a predetermined tolerance indicative of wear or damage to said no-compensation type vehicle wheel adapter.

12. A method for correcting wear or damage to a no-compensation type vehicle wheel adapter having a sensor mounting shaft socket and a plurality of adjustable contact points for use with vehicle wheel alignment sensors, the method comprising the steps of:
    securing a no-compensation type vehicle wheel adapter such that each of the plurality of adjustable contact points are in contact with a planar surface; and
    adjusting at least one of the plurality of adjustable contact points such that the sensor mounting shaft socket is aligned relative to said planar surface.

13. The method of claim 12 wherein the sensor mounting shaft socket is aligned perpendicular to said planar surface.

14. The method of claim 12 wherein adjusting the vehicle wheel adapter includes the step of altering the configuration of at least one of the plurality of contact points.

15. The method of claim 14 wherein the plurality of contact points each have a telescoping configuration, said step of altering the configuration of at least one of the plurality of contact points including either extension and retraction of the contact point.

16. The method of claim 14 wherein the plurality of contact points each have a threaded configuration, said step of altering the configuration of at least one of the plurality of contact points including threaded rotation of the contact point.

17. The method of claim 12 further including at least once performing the sequence of:
    rotating the secured no-compensation type vehicle wheel adapter to place the plurality of adjustable contact points at different locations on said planar surface; and
    adjusting at least one of the vehicle wheel adapter adjustable contact points such that the sensor mounting shaft socket is again aligned relative to said planar surface.

18. A method for correcting wear or damage to a no-compensation type vehicle wheel adapter having a sensor mounting shaft socket and a plurality of adjustable contact points for use with vehicle wheel alignment sensors, the method comprising the steps of:

holding said plurality of adjustable contact points in known relation with a planar surface at a first position;

adjusting said vehicle wheel adapter adjustable contact points such that said sensor mounting shaft socket is aligned relative to said planar surface at said first position; and wherein adjusting said vehicle wheel adapter includes altering the alignment of said sensor mounting shaft socket.

19. A method for detecting wear or damage to a no-compensation type vehicle wheel adapter having a sensor mounting shaft socket and a plurality of contact points, the method comprising the steps of:

providing a calibration fixture having a reference surface and a holding shaft projecting perpendicular thereto;

securing the vehicle wheel adapter to said holding shaft such that the sensor mounting shaft socket and said holding shaft are co-axially aligned; and adjusting at least one of the plurality of contact points such that the plurality of contact points are equidistant from said reference surface.

20. A method for detecting wear or damage to a no-compensation type vehicle wheel adapter having a sensor mounting shaft socket, a plurality of contact points, and a reference surface which is normal, to within a predetermined tolerance, a longitudinal axis of the sensor mounting shaft socket, the method comprising the step of:

adjusting at least one of the plurality of contact points such that the plurality of contact points are equidistant from a plane defined by the reference surface.

21. A method for preparing a vehicle wheel alignment sensor for use, comprising the steps of:

computing a first set of sensor calibration values for use with vehicle wheel runout compensation;

storing said first set of calibration values;

computing at least one additional set of sensor calibration values for use without vehicle wheel runout compensation; and storing said at least one additional set of calibration values.

22. A vehicle wheel alignment system including a wheel alignment console and at least one vehicle wheel alignment sensor, the system comprising:

a controller located in said wheel alignment console configured to receive input and determine vehicle wheel alignment parameters;

a memory in communication with said controller, said memory configured to store a plurality of sensor calibration values; and said controller configured responsive to the presence or absence of a measure of vehicle wheel runout, to select and utilize at least one of said stored plurality of calibration values from said memory to compensate measurements received from the at least one wheel alignment sensor.

23. A method for determining vehicle wheel alignment parameters of a motor vehicle having a plurality of vehicle wheels, comprising the steps of:

for each of said plurality of vehicle wheels, mounting thereon an individual vehicle wheel adapter, each of said individual wheel adapters of a predetermined type and having a wheel runout compensation method comprising at least one of either assuming negligible introduced runout or measuring actual wheel runout;

attaching to each individual vehicle wheel adapter a corresponding one of a plurality of vehicle wheel alignment sensors;

recalling, for each of said plurality of vehicle wheel alignment sensors, a calibration value associated with a wheel runout compensation method required by said predetermined type of vehicle wheel adapter to which said vehicle wheel alignment sensor is attached; and utilizing said recalled calibration values in obtaining vehicle wheel alignment parameters from each of said vehicle wheel alignment sensors.

* * * * *